United States Patent
Litwiller

(10) Patent No.: US 10,525,480 B2
(45) Date of Patent: Jan. 7, 2020

(54) PLANT VINE CHOPPER ASSEMBLY

(71) Applicant: Sheldon Litwiller, Buhl, ID (US)

(72) Inventor: Sheldon Litwiller, Buhl, ID (US)

( * ) Notice: Subject to any disclaimer, the term of this patent is extended or adjusted under 35 U.S.C. 154(b) by 0 days.

(21) Appl. No.: 15/669,891

(22) Filed: Aug. 4, 2017

(65) Prior Publication Data

US 2019/0082589 A1    Mar. 21, 2019

Related U.S. Application Data

(60) Provisional application No. 62/371,202, filed on Aug. 4, 2016.

(51) Int. Cl.

| | |
|---|---|
| *B02C 18/18* | (2006.01) |
| *A01G 3/00* | (2006.01) |
| *A01B 33/02* | (2006.01) |
| *A01B 33/10* | (2006.01) |
| *A01D 34/52* | (2006.01) |
| *A01D 34/62* | (2006.01) |
| *A01D 34/43* | (2006.01) |

(52) U.S. Cl.
CPC ............ *B02C 18/18* (2013.01); *A01B 33/024* (2013.01); *A01B 33/103* (2013.01); *A01D 34/43* (2013.01); *A01D 34/52* (2013.01); *A01D 34/62* (2013.01); *A01G 3/002* (2013.01); *B02C 18/182* (2013.01)

(58) Field of Classification Search
CPC .......... A01F 29/02; A01F 29/04; A01B 29/00; A01B 29/04; A01B 33/024; A01B 45/026; A01B 33/103; B02C 18/06; B02C 18/18; B02C 18/182; B02C 18/184; A01G 3/002
See application file for complete search history.

(56) References Cited

U.S. PATENT DOCUMENTS

| | | | | |
|---|---|---|---|---|
| 307,913 | A * | 11/1884 | Chandler | B02C 18/182 241/295 |
| 1,572,777 | A * | 2/1926 | Dorman | A01B 33/024 172/112 |
| 1,582,827 | A * | 4/1926 | Krizer | A01B 33/024 172/154 |
| 4,901,929 | A * | 2/1990 | Barclay | B02C 18/142 241/236 |
| 2003/0154607 | A1 * | 8/2003 | Hamptaux | A01G 3/002 30/265 |

FOREIGN PATENT DOCUMENTS

EP    0785026 A1 *  7/1997 ............. A01G 3/002

* cited by examiner

*Primary Examiner* — Alicia Torres
(74) *Attorney, Agent, or Firm* — Charles R. Clark

(57) ABSTRACT

A plant vine chopper rotor drum assembly has a plurality of rotor rings spaced along, encircling, and attached to the longitudinal outer surface of a rotatable main drum tube. Each rotor ring has one or more pairs of angled mounting tabs that alternate to the left and to the right to the general plane of respective rotor ring; and the rotor rings are distributed in a cutting zone along and surrounding the longitudinal rotational axis of the drum tube with each mounting tab having a generally planar cutting blade attached. The angled blades distributed around the outer circumference of the ring cooperate one with another during operational rotation of the drum to guard each blade and the drum against the wrapping of clogging fibrous strands and other clogging material around the drum.

3 Claims, 4 Drawing Sheets

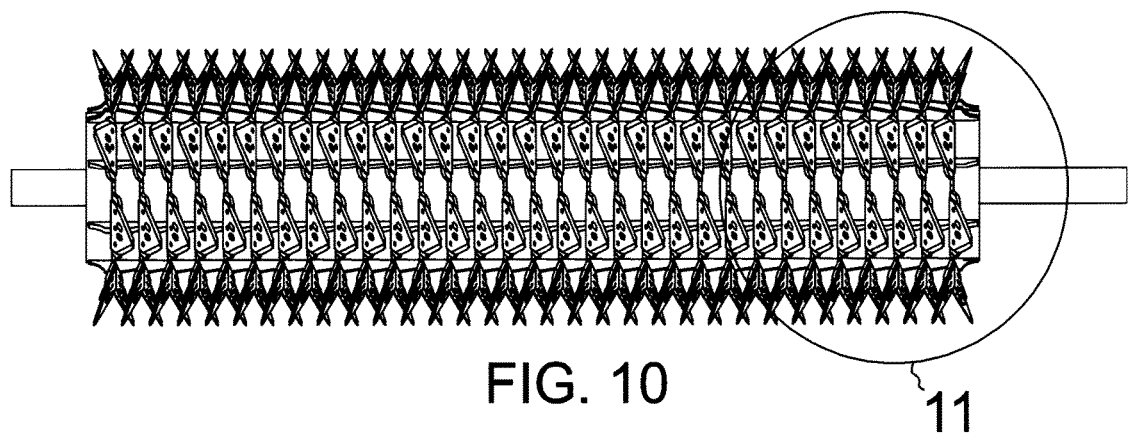
FIG. 10
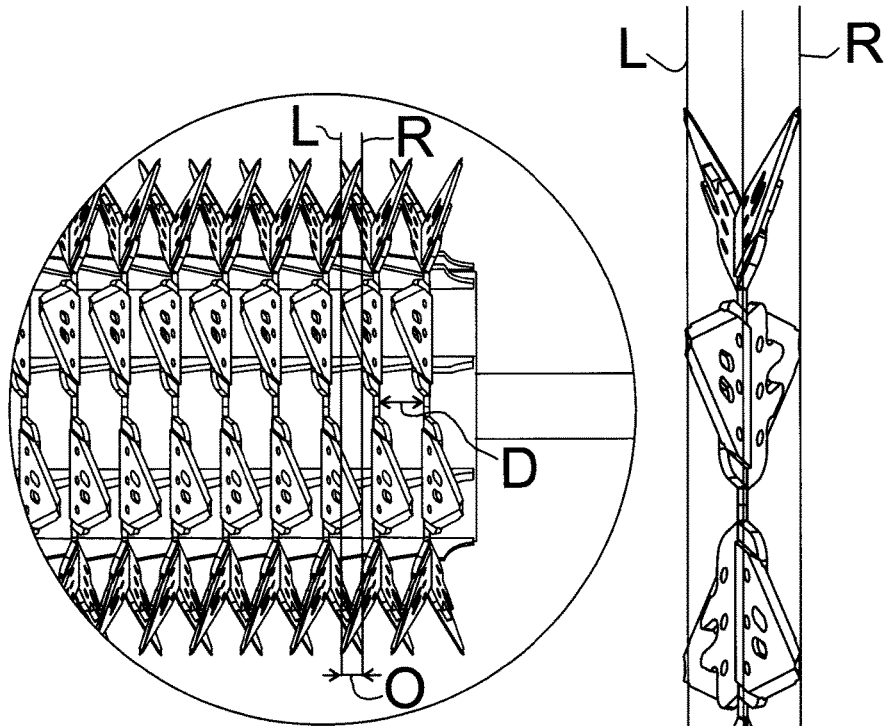
FIG. 11
FIG. 12

PLANT VINE CHOPPER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Field of the Invention

The present invention relates to providing an improved organic material and plant vine chopper rotor drum assembly 10 for use in chopping machines that chop plant vines and other organic material to a finer and more consistent chopped product than other preexisting chopper rotor drums have achieved. Preexisting chopper rotor drums are often plagued by plant vines and other long fibrous strands wrapping around the drum that results in a clogging or decrease in the chopping effectiveness of the drum and that requires the user to stop the drum rotation to pull away or to cut away the clogging strands or other clogging material. The present invention provides a rotor drum having a plurality of rotor rings each ring having a plurality of angled blades that effectively cooperate with each other to guard each blade and the drum against the wrapping of clogging fibrous strands and other clogging material around the drum. The stream of material interacting with the present invention likely is met in a cutting zone of the drum by angled cutting edges of blades that have preselected fabricated crossing angled overlapping circular sweep portions of the blades distributed along the longitudinal axis of the drum along the length of the cutting zone of the drum.

A chopping machine for organic material and plant material that uses a rotating cutting drum after having the invention (the chopper rotor drum assembly) incorporated to replace the cutting drum has more utility than before. The present invention is less susceptible to clogging or fouling by fibrous strands or other material; the rotor drum of the present invention slices fibrous strands before the strands can wrap and clog the rotor drum and the chopped product resulting from use of the present invention will have an improved consistency over a product resulting from use of the preexisting rotor drum. The angled blades may also shield the outer arced surface of the rotor drum tube from unimpeded impact interaction by the process material being chopped. The angled blades may keep the process material in a cutting zone of faster relative motion by the cutting edges (farther away from the center of rotation.

The invention enables the substitution or incorporation of the improved rotor drum appropriately sized into preexisting chopping machines that use less capable rotor drums. The invention lessens the likelihood of clogging of the rotor drum by fibrous strands or other material by increasing the likelihood that the strands and other material will be effectively sliced by angled edges of blades that sweep in overlapping angled cutting arcs along the length of the cutting zone of the drum.

The plant vine chopper rotor drum assembly incorporates a plurality of spaced rotor rings 30 spaced along and encircling and attached to a main drum tube 20 and distributed in a cutting zone along and surrounding the longitudinal rotational axis of the drum tube with each rotor ring having a pair or a plurality of pairs of cutting blades attached to respective alternately angled mounting tabs that alternate to the left and to the right to the general plane of the rotor ring. The blades are mounted generally coplanar to respective angled mounting tabs and alternatively to the left and to the right of the central rotational plane of the ring. The angle of the mounting tabs and the blades is selected from a range of ten to forty-five (10 to 45) degrees leftward or rightward from the general plane of the rotor ring. In a best embodiment, the angle of the mounting tabs of a ring alternates twenty-two and half (22.5) degrees to the left and to the right as shown in FIGS. 2 and 7.

In the best embodiment generally planar and triangular agricultural sickle blades are attached to the angled tabs as shown in FIGS. 6 to 12 with the two cutting edges of each blade projecting outward along converging lines away from the center of the rotor ring.

Preferably the rotor rings are spaced along the rotor drum such that the sweep circle of the cutting edges of the blades of the leftward angled tabs of one rotor ring overlap the sweep circle of the cutting edges of the blades of the rightward angled tabs of adjacent rotor rings.

The invention provides an operator with an improved rotor drum that has the ability to chop fibrous organic material and plant vines without the material and vines wrapping around and fouling the drum.

BRIEF SUMMARY OF THE INVENTION

A principal objective of the invention is to provide a manufacturer, farmer or other user with an improved rotor drum assembly that can chop fibrous organic material and plant vines without the material and vines wrapping around the drum and fouling the drum that is simple, low-maintenance, and reliable.

Additional and various other objects and advantages attained by the invention will become more apparent as the specification is read and the accompanying figures are reviewed.

BRIEF DESCRIPTION OF THE SEVERAL VIEWS OF THE DRAWING

FIG. 10 is a side view of a plant vine chopper rotor drum assembly 10;

FIG. 11 is an enlarged circled portion of the side view of the plant vine chopper rotor drum assembly 10 shown in FIG. 10 and showing spaced reference lines L and R that indicate the rotational planes of the respective tips of the blades and shows that the tips overlap a distance O that can be selected during manufacture by selecting a separation distance D between adjacent rings (can be accomplished by varying distances between or among the comb rail slots;

FIG. 12 is an axial view of an eight tab rotor ring 30 mounted with eight blades that around the circumference of the ring alternative leftward or rightward to the general central rotational plane C of the central portion of the ring.

DETAILED DESCRIPTION OF THE INVENTION

Figure 1:
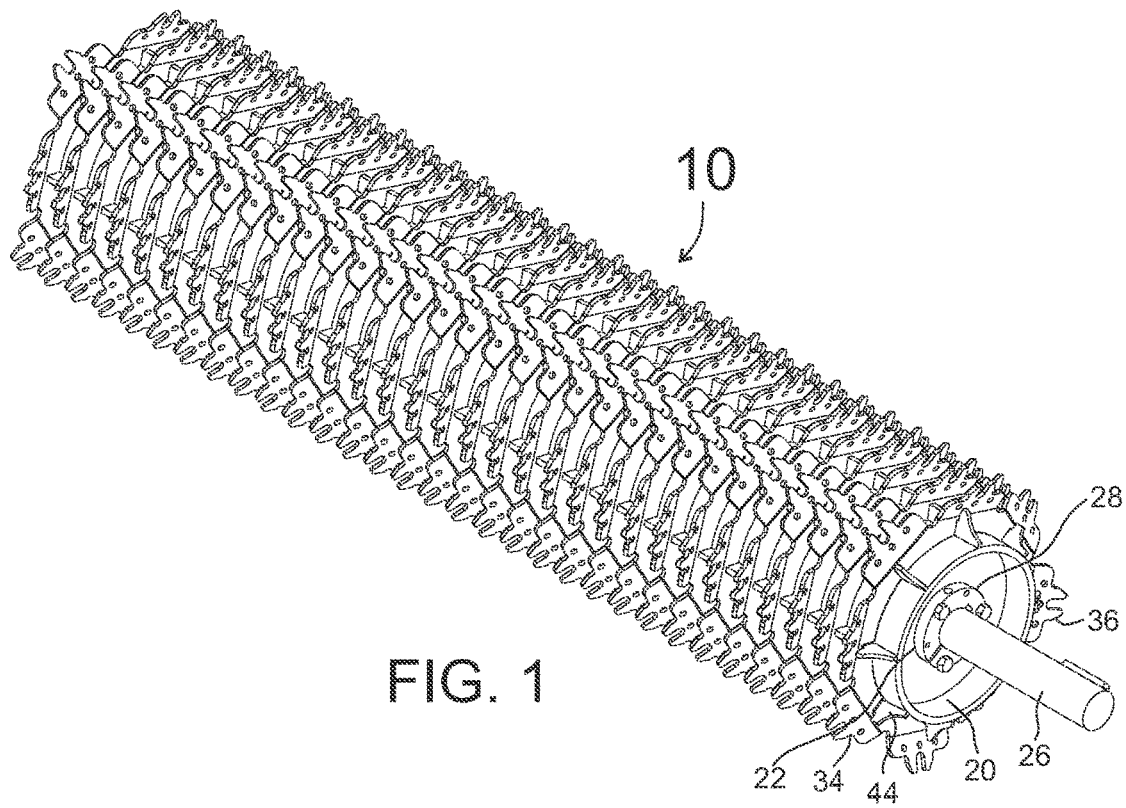
FIG. 1 is a perspective view of a plant vine chopper rotor drum assembly 10 (cutting blades not shown)
Figure 2:
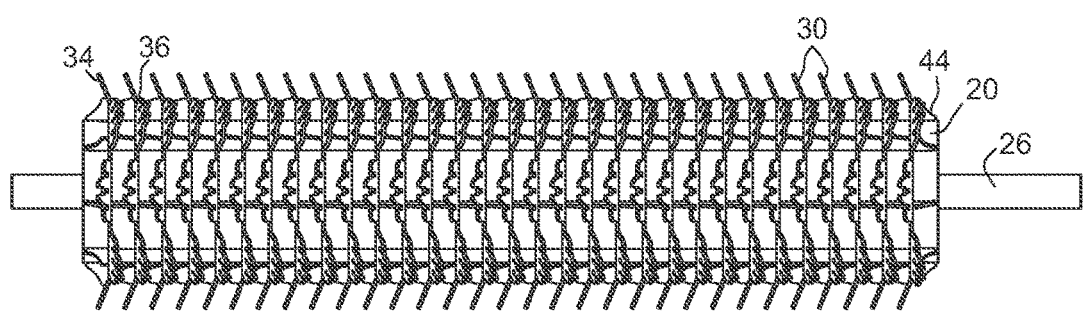
FIG. 2 is a side view of the rotor drum assembly shown in FIG. 1.
Figure 3:
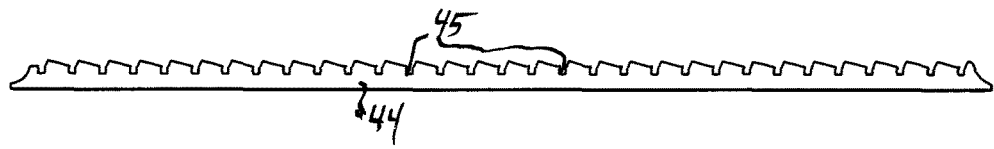
FIG. 3 is a side view of a rotor comb rail 44 having a plurality of ring slots 45 for registering the positions of rotor rings during fabrication.
Figure 4:
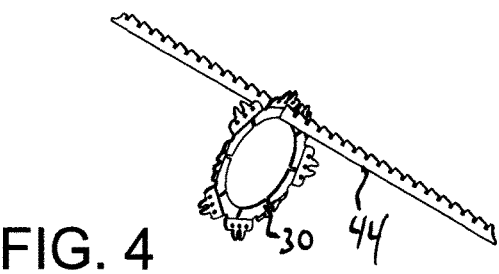
FIG. 4 is a partial, perspective view of a drum assembly during fabrication showing a rotor ring placed on and aligned in one sequential ring slot of the comb.
Figure 5:
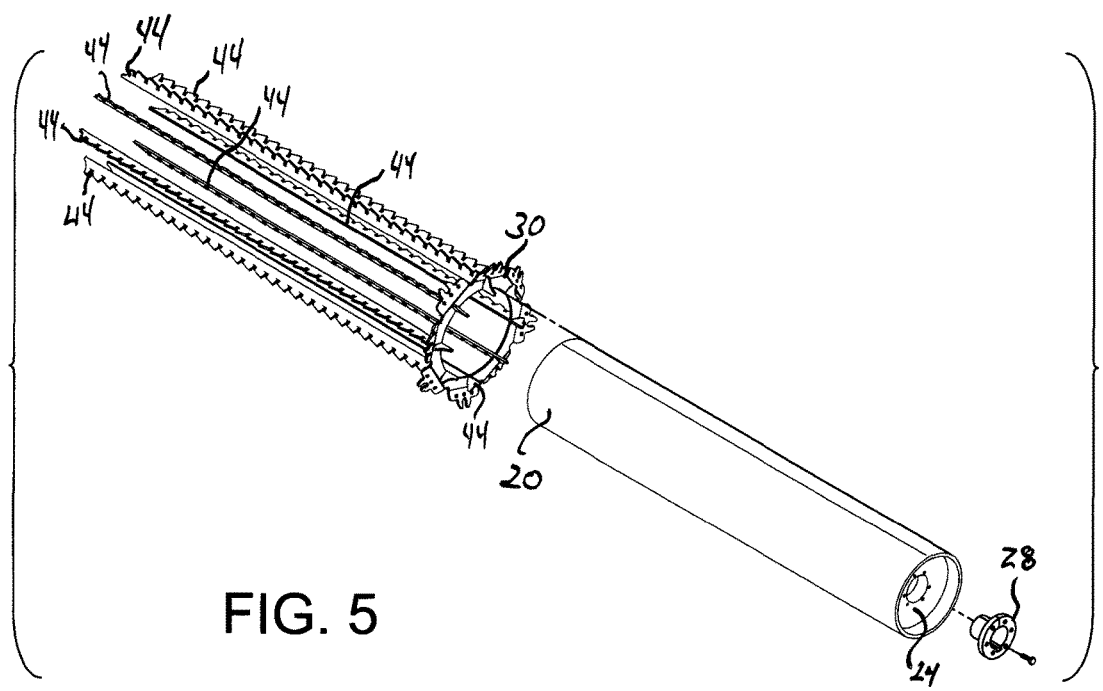
FIG. 5 is a partial, perspective view of a drum assembly during fabrication showing a rotor ring placed on and aligned in one sequential ring slot 45 of the comb and showing a plurality of rotor combs aligned to receive additional rotor rings and provisionally aligned to receive the set of combs and rings that will serve to complete the full set of rings and combs that then will be translated onto and around the rotor drum tube and attached to the tube.
Figure 6:
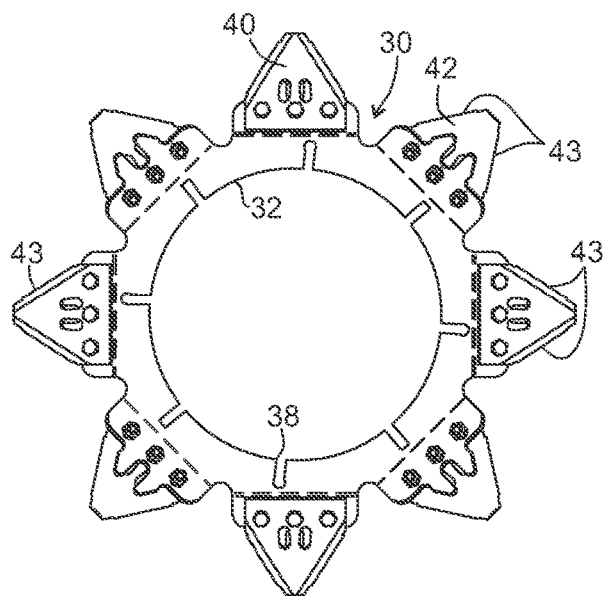
FIG. 6 is an axial view of an eight tab rotor ring 30 mounted with eight blades that around the circumference of the ring alternative upward or downward to the general central plane of the central portion of the ring.

Referring to FIGS. 1 to 12, the present invention is a novel organic material and plant vine chopper rotor drum assembly 10 for a chopping machine that uses a rotating chopper rotor drum. The organic material and plant vine chopper rotor drum assembly 10 can be appropriately sized to advantageously replace a less effective chopper rotor drum.

The elements of the invention, an organic material and plant vine chopper rotor drum assembly 10 to be incorporated into a chopper machine having a cutting zone along the length of a rotor drum tube comprises:
a rotor drum tube 20 having
two rotor hubs 22 attached coaxially one hub within each end of the drum tube;
two hub to drum collars 24 (if required to accommodate the diameter of the drum tube are mounted between the inside of the tube and the hub); a main rotor drum shaft 26 inserted through and retained in said hubs and said drum tube by two rotor bushings 28 (SK style appropriate)(one rotor bushing at each end of the drum tube)(or another drum mounting means known in the art could be used);

a plurality of generally planar rotor rings 30 attached to said drum tube, said plurality of rings selectively distributed along said drum tube within said cutting zone as shown in FIG. 10 with preferably the rings evenly spaced one from another;

each said ring having
a central drum aperture 32 perpendicular to the general plane of said ring and having one or more pairs of angled blade mounting tabs extending outward and across the center of the ring with one tab of the pair being
a leftward angled tab 34 and the other tab of the pair being
a rightward angled tab 36, and having
one or more rotor comb slots 38 distributed around the periphery of said tube aperture, said comb slots preferably radiating outward toward the outer edge of the ring and sized to cooperate with adjacent one or more comb rails 44
a generally planar cutting blade 40, 42 attached generally coplanar to each angled tab preferably using nuts and bolts with appropriate apertures in said angled tab and said blade having cutting edges along two of the three sides of the blade, preferably said cutting blade is a generally triangularly shaped sickle blade, and one or more
rotor comb rails 44 having a plurality of spaced sequential ring slots 45 attached to the tube and to the rings preferably by welding.

Figure 7:
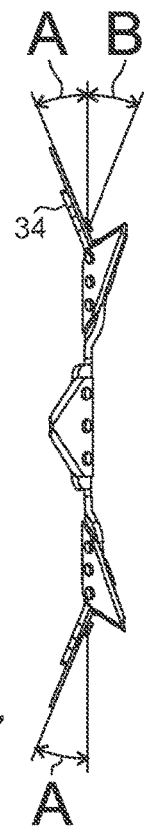
FIG. 7 is a side view of the eight tab rotor ring shown in FIG. 6 showing two selected leftward angles (Angle A) from the general plane of said ring of the leftward angled tab selected from a range of ten (10) to forty-five (45) degrees during fabrication of each said ring, preferably the angle is twenty-two and half (22.5) degrees and showing a selected reference line rightward angle (Angle B) from the general plane of said ring of the rightward angled tab selected from a range of ten (10) to forty-five (45) degrees during fabrication of each said ring that will be swept by the rightward blade, preferably the angle is twenty-two and half (22.5) degrees (view is oriented transverse to one pair of angled blade mounting tabs)
Figure 8:
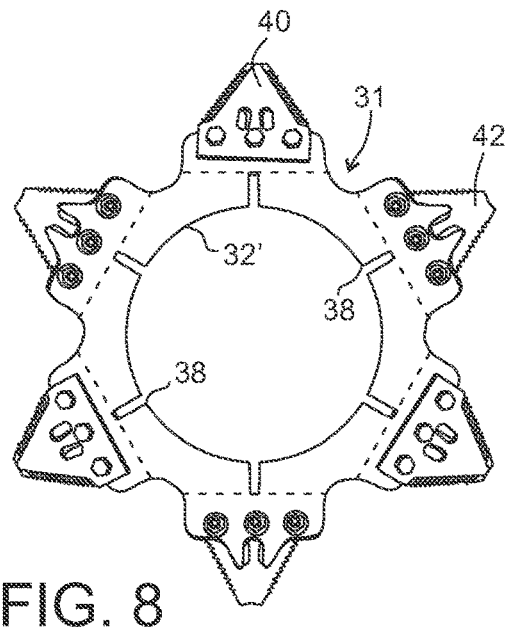
FIG. 8 an axial view of a six tab rotor ring 31 mounted with six blades that around the circumference of the ring alternative upward or downward to the general central plane of the central portion of the ring.
Figure 9:
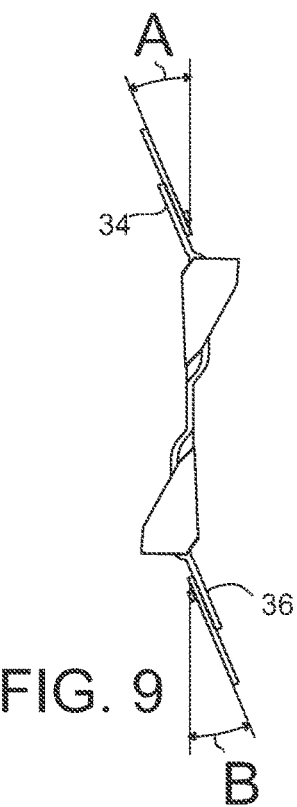
FIG. 9 is a side view of the six tab rotor ring shown in FIG. 8 showing a selected leftward angle (Angle A) from the general plane of said ring of the leftward angled tab selected from a range of ten (10) to forty-five (45) degrees during fabrication of each said ring, preferably the angle is twenty-two and half (22.5) degrees and showing a selected rightward angle (Angle B) from the general plane of said ring of the rightward angled tab selected from a range of ten (10) to forty-five (45) degrees during fabrication of each said ring that will be sweep by the rightward blade, preferably the angle is twenty-two and half (22.5) degrees (view is oriented transverse to one pair of angled blade mounting tabs)

In FIGS. 7 and 9, Angle A is a selected leftward angle from the general plane of said ring of the leftward angled tab selected from a range of ten (10) to forty-five (45) degrees during fabrication of each said ring, preferably the angle is twenty-two and half (22.5) degrees.

In FIGS. 7 and 9, Angle B is a selected rightward angle from the general plane of said ring of the leftward angled tab selected from a range of ten (10) to forty-five (45) degrees during fabrication of each said ring, preferably the angle is twenty-two and half (22.5) degrees.

A majority of the structural components of the invention are preferably made from sheet steel stock and round steel tubing stock, or other suitable materials used in making high strength agricultural equipment. Means of joining or attaching of elements of the invention one to another preferably may include welding and nuts and bolts.

The Separation Distance D shown in FIG. 11 of one ring to the next in the fabrication of the drum assembly can be uniform or could be selectively varied.

The preceding description and exposition of a preferred embodiment of the invention is presented for purposes of illustration and enabling disclosure. It is neither intended to be exhaustive nor to limit the invention to the precise form disclosed. Modifications or variations in the invention in light of the above teachings that are obvious to one of ordinary skill in the art are considered within the scope of the invention as determined by the appended claims when interpreted to the breath to which they are fairly, legitimately and equitably entitled.

I claim:

1. A plant vine chopper rotor drum assembly comprising: a rotor drum tube having two rotor hubs attached coaxially one hub within each end of said drum tube; a main rotor drum shaft inserted through and retained in said hubs and said drum tube by two rotor bushings with one rotor bushing at each end of said drum tube; a plurality of generally planar rotor rings attached to said drum tube, said plurality of rings selectively distributed along said drum tube within cutting zone with said rings evenly spaced one from another; each said ring having a central drum aperture perpendicular to the general plane of said ring and having one or more pairs of angled blade mounting tabs extending outward from and distributed along the circumference of said ring and across the center of the ring with one tab of the pair being a leftward angled tab and the other tab of the pair being a rightward angled tab, and having one or more rotor comb slots distributed around the periphery of said aperture, said comb slots preferably radiating outward from and away from said aperture, a generally planar cutting blade attached generally coplanar to each angled tab; and one or more rotor combs distributed and attached to said drum tube around the outer circumference of drum tube and each said rotor comb having a plurality of spaced sequential ring slots.

2. A plant vine chopper rotor drum assembly according to claim 1 wherein said leftward angled tab having a selected leftward angle from the general plane of said ring selected from a range of ten (10) to forty-five (45) degrees and said rightward angled tab having a selected rightward angle from the general plane of said ring selected from a range of ten (10) to forty-five (45) degrees.

3. A plant vine chopper rotor drum assembly according to claim 1 wherein said leftward angled tab having a selected leftward angle of 22.5 degrees from the general plane of said ring and said rightward angled tab having a selected rightward angle of 22.5 degrees from the general plane of said ring.

* * * * *